US011683304B2

(12) United States Patent
Kuper et al.

(10) Patent No.: US 11,683,304 B2
(45) Date of Patent: *Jun. 20, 2023

(54) SHARING ACCESS TO A MEDIA SERVICE

(71) Applicant: Sonos, Inc., Santa Barbara, CA (US)

(72) Inventors: Ron Kuper, Arlington, MA (US); Sherwin Liu, Boston, MA (US); Emilio Arce, Cambridge, MA (US); Arthur L. Coburn, IV, Lexington, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/486,329

(22) Filed: Sep. 27, 2021

(65) Prior Publication Data

US 2022/0124082 A1 Apr. 21, 2022

Related U.S. Application Data

(63) Continuation of application No. 16/773,280, filed on Jan. 27, 2020, now Pat. No. 11,134,076, which is a (Continued)

(51) Int. Cl.
*H04L 9/40* (2022.01)
*H04N 21/436* (2011.01)
(Continued)

(52) U.S. Cl.
CPC ............ *H04L 63/083* (2013.01); *H04L 63/10* (2013.01); *H04L 65/762* (2022.05); *H04L 67/60* (2022.05);
(Continued)

(58) Field of Classification Search
CPC ....... H04L 63/08; H04L 63/083; H04L 63/10; H04L 63/105; H04L 65/762; H04L 67/60;
(Continued)

(56) References Cited

U.S. PATENT DOCUMENTS 5,406,634 A 4/1995 Anderson et al.
5,440,644 A 8/1995 Farinelli et al.
(Continued)

FOREIGN PATENT DOCUMENTS

EP 1389853 A1 2/2004
KR 20090017795 2/2009
(Continued)

OTHER PUBLICATIONS

Advisory Action dated Apr. 22, 2021, issued in connection with U.S. Appl. No. 16/372,014, filed Apr. 1, 2019, 3 pages.
(Continued)

*Primary Examiner* — Hosuk Song

(57) ABSTRACT

Examples provided herein are directed to a computing device and media playback system sharing access to a media service corresponding to a media application installed on the computing device. In one example, a media playback system may be configured to (i) receive from the computing device an authorization code that corresponds to a media application installed on the computing device that is authorized to access media from a media service, (ii) transmit to the media service an authorization request with the authorization code, (iii) receive from the media service an authorization token that facilitates obtaining media from the media service, and (iv) transmit to the media service a request for media for playback by the media playback system, where the request for media includes the authorization token.

20 Claims, 7 Drawing Sheets

Related U.S. Application Data continuation of application No. 16/142,895, filed on Sep. 26, 2018, now Pat. No. 10,547,608, which is a continuation of application No. 15/876,928, filed on Jan. 22, 2018, now Pat. No. 10,116,652, which is a continuation of application No. 14/606,162, filed on Jan. 27, 2015, now Pat. No. 9,876,780.

(60) Provisional application No. 62/083,127, filed on Nov. 21, 2014.

(51) Int. Cl.
  *H04N 21/475*   (2011.01)
  *H04N 21/6334*   (2011.01)
  *H04L 65/75*   (2022.01)
  *H04L 67/60*   (2022.01)
  *H04N 21/258*   (2011.01)
  *H04N 21/835*   (2011.01)
  *H04N 21/41*   (2011.01)

(52) U.S. Cl.
  CPC ... *H04N 21/25875* (2013.01); *H04N 21/4126* (2013.01); *H04N 21/41265* (2020.08); *H04N 21/43615* (2013.01); *H04N 21/4753* (2013.01); *H04N 21/6334* (2013.01); *H04N 21/835* (2013.01)

(58) Field of Classification Search
  CPC ......... H04N 21/25875; H04N 21/4126; H04N 21/43615; H04N 21/4753; H04N 21/835; H04N 21/41265; H04N 21/6334; G06F 21/31; G06F 21/34; G06F 21/35; G06F 21/44; G06F 21/445
See application file for complete search history.

(56) References Cited

U.S. PATENT DOCUMENTS

| | | | |
|---|---|---|---|
| 5,761,320 A | 6/1998 | Farinelli et al. | |
| 5,856,827 A | 1/1999 | Sudo | |
| 5,923,902 A | 7/1999 | Inagaki | |
| 6,002,862 A | 12/1999 | Takaike | |
| 6,032,202 A | 2/2000 | Lea et al. | |
| 6,181,316 B1 | 1/2001 | Little et al. | |
| 6,255,961 B1 | 7/2001 | Van et al. | |
| 6,256,554 B1 | 7/2001 | DiLorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,587,127 B1 | 7/2003 | Leeke et al. | |
| 6,611,537 B1 | 8/2003 | Edens et al. | |
| 6,631,410 B1 | 10/2003 | Kowalski et al. | |
| 6,728,531 B1 | 4/2004 | Lee et al. | |
| 6,732,155 B2 | 5/2004 | Meek | |
| 6,757,517 B2 | 6/2004 | Chang | |
| 6,778,869 B2 | 8/2004 | Champion | |
| 6,826,283 B1 | 11/2004 | Wheeler et al. | |
| 6,892,307 B1 | 5/2005 | Wood et al. | |
| 6,985,694 B1 | 1/2006 | De Bonet et al. | |
| 7,017,118 B1 | 3/2006 | Carroll | |
| 7,020,048 B2 | 3/2006 | McComas | |
| 7,113,833 B1 | 9/2006 | Brown et al. | |
| 7,117,451 B2 | 10/2006 | Sielken | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,187,947 B1 | 3/2007 | White et al. | |
| 7,236,773 B2 | 6/2007 | Thomas | |
| 7,295,548 B2 | 11/2007 | Blank et al. | |
| 7,312,785 B2 | 12/2007 | Tsuk et al. | |
| 7,358,960 B2 | 4/2008 | Mak | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,742,740 B2 | 6/2010 | Goldberg et al. | |
| 7,805,682 B1 | 9/2010 | Lambourne | |
| 7,853,341 B2 | 12/2010 | McCarty et al. | |
| 7,899,187 B2 | 3/2011 | Messerges et al. | |
| 7,975,312 B2 | 7/2011 | Broderson et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,050,652 B2 | 11/2011 | Qureshey et al. | |
| 8,074,253 B1 | 12/2011 | Nathan | |
| 8,103,009 B2 | 1/2012 | McCarty et al. | |
| 8,131,390 B2 | 3/2012 | Braithwaite et al. | |
| 8,234,395 B2 | 7/2012 | Millington | |
| 8,387,124 B2 | 2/2013 | Smetters et al. | |
| 8,483,853 B1 | 7/2013 | Lambourne | |
| 8,590,028 B2 | 11/2013 | Saxena et al. | |
| 8,615,794 B1 | 12/2013 | Tomilson et al. | |
| 8,831,570 B2 | 9/2014 | Garskof | |
| 8,880,098 B2 | 11/2014 | Shobatake | |
| 8,910,265 B2 | 12/2014 | Lang et al. | |
| 8,942,252 B2 | 1/2015 | Balassanian et al. | |
| 8,955,069 B1 | 2/2015 | Dotan et al. | |
| 8,959,598 B2 * | 2/2015 | Smith | H04W 12/068 |
| | | | 713/168 |
| 9,043,492 B2 | 5/2015 | A. R. et al. | |
| 9,065,819 B1 | 6/2015 | Shanmugam et al. | |
| 9,137,564 B2 | 9/2015 | Reimann | |
| 9,143,492 B2 | 9/2015 | Redberg et al. | |
| 9,178,962 B2 | 11/2015 | Le et al. | |
| 9,185,445 B2 | 11/2015 | Kirksey | |
| 9,223,862 B2 | 12/2015 | Beckhardt | |
| 9,226,072 B2 | 12/2015 | Bender et al. | |
| 9,232,277 B2 | 1/2016 | Vega-Zayas et al. | |
| 9,235,715 B1 | 1/2016 | Bailey et al. | |
| 9,264,413 B2 | 2/2016 | Zhang | |
| 9,286,384 B2 | 3/2016 | Kuper et al. | |
| 9,361,371 B2 | 6/2016 | Coburn, IV et al. | |
| 9,374,356 B2 | 6/2016 | Sondhi et al. | |
| 9,374,607 B2 | 6/2016 | Bates et al. | |
| 9,386,014 B2 | 7/2016 | Redberg et al. | |
| 9,402,093 B2 | 7/2016 | Lieu et al. | |
| 9,411,942 B2 | 8/2016 | Commons et al. | |
| 9,460,755 B2 | 10/2016 | Coburn, IV | |
| 9,495,076 B2 | 11/2016 | Kumar et al. | |
| 9,501,533 B2 | 11/2016 | Coburn, IV et al. | |
| 9,531,697 B2 | 12/2016 | Sondhi et al. | |
| 9,531,833 B2 | 12/2016 | Le et al. | |
| 9,544,294 B2 | 1/2017 | Srinivasan et al. | |
| 9,578,014 B2 * | 2/2017 | Sondhi | H04L 63/0807 |
| 9,654,821 B2 | 5/2017 | Coburn, IV et al. | |
| 9,674,587 B2 | 6/2017 | Triplett et al. | |
| 9,684,484 B2 | 6/2017 | Kumar et al. | |
| 9,703,521 B2 | 7/2017 | Kumar et al. | |
| 9,735,978 B2 | 8/2017 | Kumar et al. | |
| 9,787,684 B2 | 10/2017 | Neafsey et al. | |
| 9,798,510 B2 | 10/2017 | Kumar et al. | |
| 9,813,400 B2 | 11/2017 | Ross et al. | |
| 9,860,234 B2 * | 1/2018 | Sondhi | H04L 63/0853 |
| 9,871,778 B1 | 1/2018 | Taralika et al. | |
| 9,876,780 B2 | 1/2018 | Kuper et al. | |
| 9,888,276 B2 | 2/2018 | Bolin | |
| 9,953,179 B2 | 4/2018 | Kumar et al. | |
| 9,977,561 B2 | 5/2018 | Bates et al. | |
| 10,057,763 B2 | 8/2018 | Redberg et al. | |
| 10,102,510 B2 | 10/2018 | Yau et al. | |
| 10,116,652 B2 | 10/2018 | Kuper et al. | |
| 10,148,637 B2 | 12/2018 | Taralika et al. | |
| 10,382,203 B1 * | 8/2019 | Loladia | H04L 63/06 |
| 10,462,505 B2 | 10/2019 | Coburn, IV et al. | |
| 10,498,833 B2 | 12/2019 | Schulert | |
| 10,547,608 B2 | 1/2020 | Kuper et al. | |
| 10,708,259 B2 | 7/2020 | Vongsouvanh et al. | |
| 10,715,973 B2 | 7/2020 | Kumar et al. | |
| 10,757,824 B1 | 8/2020 | Yueh et al. | |
| 11,134,076 B2 * | 9/2021 | Kuper | H04N 21/41265 |

(56) References Cited

U.S. PATENT DOCUMENTS

| | | |
|---|---|---|
| 11,394,712 B2 | 7/2022 | Monica et al. |
| 2001/0042107 A1 | 11/2001 | Palm |
| 2002/0002039 A1 | 1/2002 | Qureshey et al. |
| 2002/0022453 A1 | 2/2002 | Balog et al. |
| 2002/0026442 A1 | 2/2002 | Lipscomb et al. |
| 2002/0077984 A1 | 6/2002 | Ireton |
| 2002/0124097 A1 | 9/2002 | Isely et al. |
| 2002/0146237 A1 | 10/2002 | Safadi |
| 2002/0165921 A1 | 11/2002 | Sapieyevski |
| 2002/0178191 A1 | 11/2002 | Sielken |
| 2003/0023741 A1 | 1/2003 | Tomassetti et al. |
| 2003/0060189 A1 | 3/2003 | Minear et al. |
| 2003/0157951 A1 | 8/2003 | Hasty, Jr. |
| 2003/0198257 A1 | 10/2003 | Sullivan et al. |
| 2003/0210796 A1 | 11/2003 | McCarty et al. |
| 2004/0024478 A1 | 2/2004 | Hans et al. |
| 2004/0024688 A1 | 2/2004 | Bi et al. |
| 2004/0025185 A1 | 2/2004 | Goci et al. |
| 2004/0078383 A1 | 4/2004 | Mercer et al. |
| 2004/0078812 A1 | 4/2004 | Calvert |
| 2004/0215611 A1 | 10/2004 | Jawa et al. |
| 2004/0261040 A1 | 12/2004 | Radcliffe et al. |
| 2005/0028225 A1 | 2/2005 | Dawson et al. |
| 2005/0108320 A1 | 5/2005 | Lord et al. |
| 2005/0108413 A1 | 5/2005 | Melmon |
| 2005/0155072 A1 | 7/2005 | Kaczowka et al. |
| 2005/0166157 A1 | 7/2005 | Ollis et al. |
| 2005/0262253 A1 | 11/2005 | Li et al. |
| 2006/0085862 A1 | 4/2006 | Witt et al. |
| 2006/0107237 A1 | 5/2006 | Kim |
| 2006/0168340 A1 | 7/2006 | Heller et al. |
| 2006/0253782 A1 | 11/2006 | Stark et al. |
| 2007/0038999 A1 | 2/2007 | Millington |
| 2007/0136778 A1 | 6/2007 | Birger et al. |
| 2007/0142944 A1 | 6/2007 | Goldberg et al. |
| 2007/0220430 A1 | 9/2007 | Sato |
| 2007/0250636 A1 | 10/2007 | Stephens |
| 2007/0288470 A1 | 12/2007 | Kauniskangas et al. |
| 2008/0005690 A1 | 1/2008 | Van Vugt |
| 2008/0016465 A1 | 1/2008 | Foxenland |
| 2008/0092204 A1 | 4/2008 | Bryce et al. |
| 2008/0134256 A1 | 6/2008 | Dacosta |
| 2008/0168568 A1 | 7/2008 | Brodersen et al. |
| 2008/0250062 A1 | 10/2008 | Huang et al. |
| 2008/0289006 A1 | 11/2008 | Hock et al. |
| 2009/0222907 A1 | 9/2009 | Guichard |
| 2009/0228919 A1 | 9/2009 | Zott et al. |
| 2010/0076971 A1 | 3/2010 | Barish et al. |
| 2010/0082731 A1 | 4/2010 | Haughay et al. |
| 2010/0131567 A1 | 5/2010 | Dorogusker et al. |
| 2010/0202755 A1 | 8/2010 | Ariya |
| 2010/0284389 A1 | 11/2010 | Ramsay et al. |
| 2011/0179455 A1 | 7/2011 | Thompson |
| 2011/0264732 A1 | 10/2011 | Robbin et al. |
| 2012/0117586 A1 | 5/2012 | McCoy et al. |
| 2012/0304233 A1 | 11/2012 | Roberts et al. |
| 2013/0347117 A1 | 12/2013 | Parks et al. |
| 2014/0052770 A1 | 2/2014 | Gran et al. |
| 2014/0068328 A1 | 3/2014 | Jain et al. |
| 2014/0096219 A1 | 4/2014 | Lang et al. |
| 2014/0122695 A1 | 5/2014 | Kulikov et al. |
| 2014/0149544 A1 | 5/2014 | Le Nerriec et al. |
| 2014/0181947 A1 | 6/2014 | Lund |
| 2014/0277639 A1 | 9/2014 | Gomes-Casseres et al. |
| 2014/0279519 A1 | 9/2014 | Mattes et al. |
| 2014/0282882 A1 | 9/2014 | Tsui et al. |
| 2014/0330885 A1 | 11/2014 | Schulert |
| 2015/0256600 A1 | 9/2015 | Dakhane et al. |
| 2016/0301678 A1 | 10/2016 | Bakar et al. |
| 2018/0007060 A1 | 1/2018 | Leblang et al. |
| 2018/0225012 A1 | 8/2018 | Bates et al. |
| 2018/0338177 A1 | 11/2018 | Graham et al. |
| 2020/0387339 A1 | 12/2020 | House et al. |

FOREIGN PATENT DOCUMENTS

| | | |
|---|---|---|
| WO | 200147248 | 6/2001 |
| WO | 200153994 | 7/2001 |
| WO | 2003093950 A2 | 11/2003 |

OTHER PUBLICATIONS

Advisory Action dated Apr. 30, 2018, issued in connection with U.S. Appl. No. 14/330,754, filed Jul. 14, 2014, 3 pages.

AudioTron Quick Start Guide, Version 1.0, Mar. 2001, 24 pages.

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

European Patent Office, European Extended Search Report dated Jun. 18, 2020, issued in connection with European Application No. 20166880.3, 9 pages.

European Patent Office, European Office Action dated Apr. 29, 2019, issued in connection with European Application No. 15823218.1, 7 pages.

European Patent Office, Search Report dated Jun. 30, 2017, issued in connection with European Patent Application No. 15822232.2, 8 pages.

Final Office Action dated Jan. 15, 2021, issued in connection with U.S. Appl. No. 16/372,014, filed Apr. 1, 2019, 15 pages.

Final Office Action dated Jan. 26, 2017, issued in connection with U.S. Appl. No. 14/330,754, filed Jul. 14, 2014, 18 pages.

Final Office Action dated Aug. 29, 2019, issued in connection with U.S. Appl. No. 16/142,895, filed Sep. 26, 2018, 9 pages.

Final Office Action dated Nov. 3, 2018, issued in connection with U.S. Appl. No. 14/330,754, filed Jul. 14, 2014, 18 pages.

Final Office Action dated Feb. 4, 2019, issued in connection with U.S. Appl. No. 14/330,754, filed Jul. 14, 2014, 18 pages.

Final Office Action dated Nov. 4, 2020, issued in connection with U.S. Appl. No. 16/700,676, filed Dec. 2, 2019, 28 pages.

Hardt. The OAuth 2.0 Authorization Framework. Internet Engineering Task Force, Microsoft, Oct. 2012, 77 pages.

International Bureau, International Preliminary Report on Patentability, dated Jul. 10, 2014, issued in connection with International Application No. PCT/US2012/071212, filed Dec. 21, 2012, 8 pages.

International Searching Authority, International Preliminary Report on Patentability dated Jan. 26, 2017, issued in connection with International Application No. PCT/US2015/040347, filed on Jul. 14, 2015, 8 pages.

International Searching Authority, International Search Report and Written Opinion dated Mar. 30, 2016, issued in connection with International Application No. PCT/US2015/061904, filed on Nov. 20, 2015, 12 pages.

International Searching Authority, International Search Report and Written Opinion dated Nov. 4, 2015, issued in connection with International Application No. PCT/US2015/040347, filed on Jul. 14, 2015, 11 pages.

International Searching Authority, International Search Report dated Sep. 30, 2013, issued in connection with International Patent Application No. PCT/US2013/046383, filed on Jun. 18, 2013, 3 pages.

International Searching Authority, Written Opinion dated Sep. 30, 2013, issued in connection with International Patent Application No. PCT/US2013/046383, filed on Jun. 18, 2013, 7 pages.

Jo et al., "Synchronized One-to-many Media Streaming with Adaptive Playout Control," Proceedings of SPIE, 2002, pp. 71-82, vol. 4861.

(56) References Cited

OTHER PUBLICATIONS

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Apr. 1, 2020, issued in connection with U.S. Appl. No. 16/700,676, filed Dec. 2, 2019, 25 pages.
Non-Final Office Action dated Jun. 10, 2021, issued in connection with U.S. Appl. No. 16/372,014, filed Apr. 1, 2019, 10 pages.
Non-Final Office Action dated Jun. 18, 2018, issued in connection with U.S. Appl. No. 14/330,754, filed Jul. 14, 2014, 17 pages.
Non-Final Office Action dated Aug. 19, 2016, issued in connection with U.S. Appl. No. 14/330,754, filed Jul. 14, 2014, 19 pages.
Non-Final Office Action dated Feb. 19, 2021, issued in connection with U.S. Appl. No. 16/700,676, filed Dec. 2, 2019, 19 pages.
Non-Final Office Action dated Jun. 22, 2017, issued in connection with U.S. Appl. No. 14/330,754, filed Jul. 14, 2014, 15 pages.
Non-Final Office Action dated Mar. 24, 2021, issued in connection with U.S. Appl. No. 16/773,280, filed Jan. 27, 2020, 13 pages.
Non-Final Office Action dated Sep. 29, 2020, issued in connection with U.S. Appl. No. 16/372,014, filed Apr. 1, 2019, 11 pages.
Non-Final Office Action dated Apr. 3, 2018, issued in connection with U.S. Appl. No. 15/876,928, filed Aug. 22, 2018, 8 pages.
Non-Final Office Action dated Jun. 3, 2021, issued in connection with U.S. Appl. No. 17/146,141, filed Jan. 11, 2021, 15 pages.
Non-Final Office Action dated Apr. 30, 2019, issued in connection with U.S. Appl. No. 16/142,895, filed Sep. 26, 2018, 14 pages.
Non-Final Office Action dated Mar. 31, 2020, issued in connection with U.S. Appl. No. 16/372,014, filed Apr. 1, 2019, 10 pages.
Notice of Allowance dated Aug. 2, 2021, issued in connection with U.S. Appl. No. 17/146,141, filed Jan. 11, 2021, 7 pages.
Notice of Allowance dated Aug. 3, 2021, issued in connection with U.S. Appl. No. 16/700,676, filed Dec. 2, 2019, 9 pages.
Notice of Allowance dated Sep. 7, 2021, issued in connection with U.S. Appl. No. 16/372,014, filed Apr. 1, 2019, 9 pages.
Notice of Allowance dated Sep. 15, 2017, issued in connection with U.S. Appl. No. 14/606,162, filed Jan. 27, 2015, 10 pages.
Notice of Allowance dated Sep. 24, 2019, issued in connection with U.S. Appl. No. 16/142,895, filed Sep. 26, 2018, 5 pages.
Notice of Allowance dated Aug. 31, 2018, issued in connection with U.S. Appl. No. 15/876,928, filed Jan. 22, 2018, 7 pages.
Notice of Allowance dated Aug. 8, 2019, issued in connection with U.S. Appl. No. 14/330,754, filed Jul. 14, 2014, 9 pages.
Notice of Allowance dated Jun. 8, 2021, issued in connection with U.S. Appl. No. 16/773,280, filed Jan. 27, 2020, 7 pages.
Palm, Inc., "Handbook for the Palm VII Handheld," May 2000, 311 pages.
Pre-Brief Appeal Conference Decision dated Jul. 30, 2019, issued in connection with U.S. Appl. No. 14/330,754, filed Jul. 14, 2014, 2 pages.
Preinterview First Office Action dated Jul. 14, 2017, issued in connection with U.S. Appl. No. 14/606,162, filed Jan. 27, 2015, 5 pages.
Presentations at WinHEC 2000, May 2000, 138 pages.
Sonos Developer Portal—DeviceLink Authentication Mode, Oct. 14, 2014, 6 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
"Welcome. You're watching Apple TV." Apple TV 1st Generation Setup Guide, Apr. 8, 2008 http://manuals.info.apple.com/MANUALS/0/MA403/en_US/AppleTV_SetupGuide.pdf Retrieved Oct. 14, 2014, 40 pages.
"Welcome. You're watching Apple TV." Apple TV 2nd Generation Setup Guide, Mar. 10, 2011 Retrieved Oct. 16, 2014, 36 pages.
"Welcome. You're watching Apple TV." Apple TV 3rd Generation Setup Guide, Mar. 16, 2012 Retrieved Oct. 16, 2014, 36 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
European Patent Office, European EPC Article 94.3 dated Oct. 13, 2022, issued in connection with European Application No. 20166880.3, 10 pages.
Final Office Action dated Aug. 29, 2022, issued in connection with U.S. Appl. No. 17/581,187, filed Jan. 21, 2022, 12 pages.
Non-Final Office Action dated May 16, 2022, issued in connection with U.S. Appl. No. 17/581,187, filed Jan. 21, 2022, 15 pages.
Notice of Allowance dated Nov. 15, 2022, issued in connection with U.S. Appl. No. 17/527,887, filed Nov. 16, 2021, 9 pages.
Notice of Allowance dated Jun. 27, 2022, issued in connection with U.S. Appl. No. 17/521,148, filed Nov. 8, 2021, 10 pages.
Notice of Allowance dated Nov. 9, 2022, issued in connection with U.S. Appl. No. 17/581,187, filed Jan. 21, 2022, 7 pages.
Non-Final Office Action dated Apr. 5, 2023, issued in connection with U.S. Appl. No. 18/098,681, filed Jan. 18, 2023, 19 pages.
Notice of Allowance dated Apr. 18, 2023, issued in connection with U.S. Appl. No. 18/098,681, filed Jan. 18, 2023, 7 pages.

\* cited by examiner

SHARING ACCESS TO A MEDIA SERVICE

CROSS REFERENCE TO RELATED APPLICATIONS

This application claims priority to U.S. patent application Ser. No. 16/773,280, filed Jan. 27, 2020; U.S. patent application Ser. No. 16/142,895, filed Sep. 26, 2018, now U.S. Pat. No. 10,547,608; U.S. patent application Ser. No. 15/876,928, filed Jan. 22, 2018, now U.S. Pat. No. 10,116,652; U.S. patent application Ser. No. 14/606,162 filed Jan. 27, 2015, now U.S. Pat. No. 9,876,780; and U.S. Provisional Patent Application No. 62/083,127 filed Nov. 21, 2014, the contents of each of which are herein incorporated by reference in their entirety.

FIELD OF THE DISCLOSURE

The disclosure is related to consumer goods and, more particularly, to methods, systems, products, features, services, and other items directed to media playback or some aspect thereof.

BACKGROUND

Options for accessing and listening to digital audio in an out-loud setting were severely limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from virtually unlimited sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
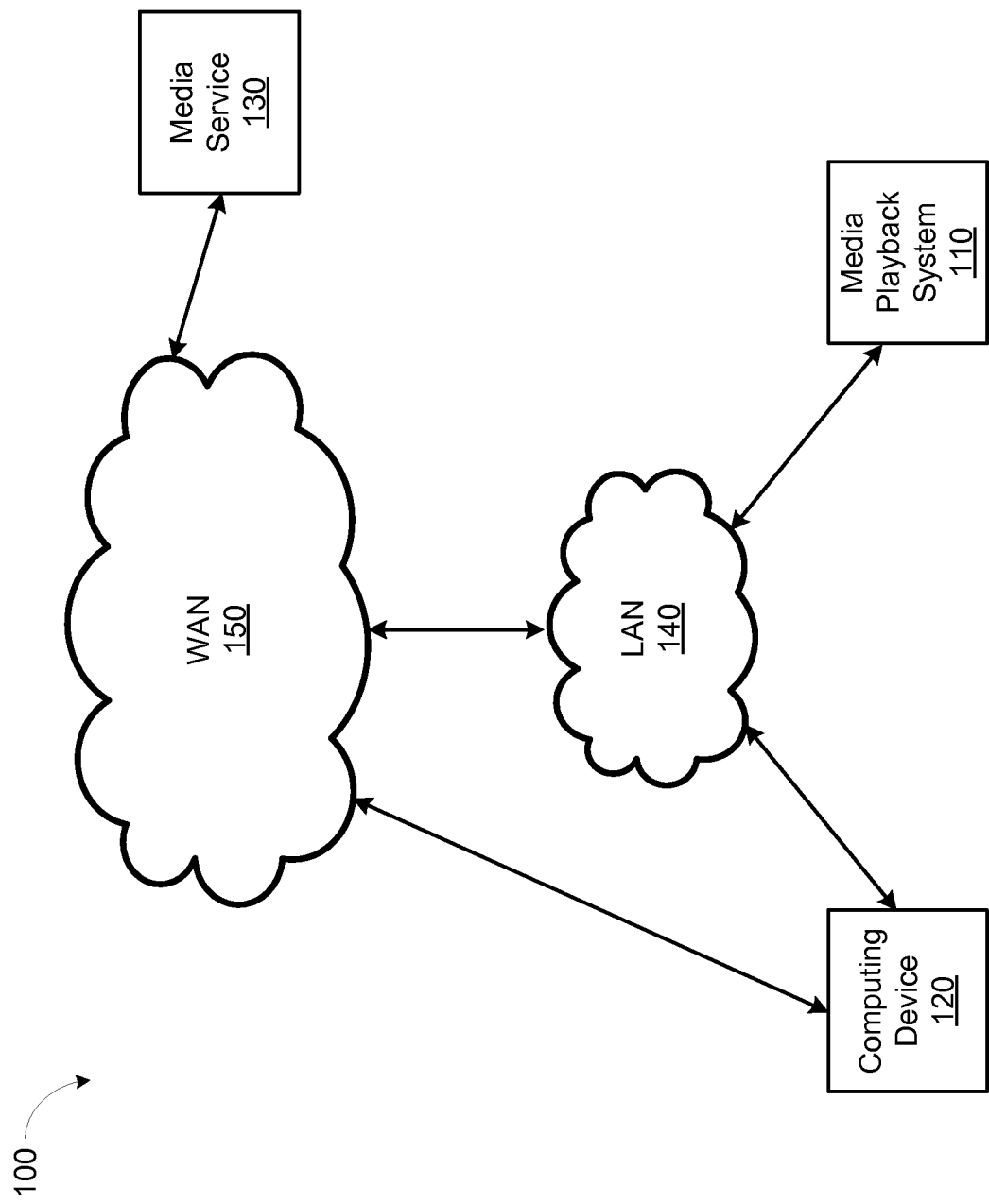
FIG. 1 shows an example network configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

According to examples described herein, a computing device may enable a media playback system to access a media service that corresponds to a media application installed on the computing device. In some examples, the media playback system might not otherwise be able to access the media service. In this way, the computing device and media playback system may share access to the media service.

In examples, various applications may be installed on a computing device, such as a smartphone, tablet, or the like, and each application may perform one or more operations. One application may take the form of a media application that operates to control a particular type of media playback system. Such a media application may be referred to herein as a "dedicated controller application." A manufacturer of a given media playback system may provide such a dedicated controller application, such as in the form of a downloadable application. Once installed on the computing device, the dedicated controller application may perform one or more setup operations to become associated with a given media playback system and thereafter be configured to control the given media playback system.

For example, the dedicated controller application may provide playback commands to the media playback system, such as pause, play, skip forward, skip backward, shuffle, repeat, etc. In another example, the dedicated controller application may be used to select a media service from which media may be provided to the media playback system. To perform such an operation, the media application may utilize a first application program interface (API) call that facilitates obtaining media from the media service.

Another application may take the form of a media application that operates to obtain media, such as music, from a media service for playback by the computing device on which the media application is installed. The media service may provide the media application to the computing device, and once a media-service account is linked to the media application, the media application may then access media from the media service. As a result, the computing device with the installed media application is authorized to access media from the media service.

Moreover, such a media application may also operate to control a media playback system. For example, at times, the media application may operate as a controller within a media playback system. During such times, the media application may cause the media playback system to perform a number of operations. For example, the media application may cause media initially being played back by the computing device to be played back by the media playback system, among other operations. To perform such an operation, the media application may utilize a second API call, different from the first API call, that facilitates obtaining media from the media service. In this way, a media playback system may be controlled via a first API call from a dedicated controller application and/or a second API call from a media application.

To illustrate, Jane may be walking down the street with her smartphone that includes an installed media application.

Jane may utilize the media application to listen to music that is provided by a media service that corresponds to the media application. The media service may provide music to Jane's smartphone via a wide-area network (WAN), such as a cellular network.

As Jane is listening to a given song, she may enter her home and come within the coverage area of her local-area network (LAN), such as a Wi-Fi or Bluetooth network. In turn, the media application may detect that a media playback system is present on the LAN and may cause a display on the smartphone to provide an option, such as a graphical icon or the like, that when selected causes the music currently playing on the smartphone to play through the media playback system.

Thereafter, the media application may receive data indicating a selection of that option, and the smartphone may then transmit an authorization code to the media playback system. The authorization code may correspond to the media application installed on the smartphone. In some examples, the authorization code may be unique to the media service and/or the media application. For instance, the authorization code may indicate the media service corresponding to the media application (e.g., "Jane's Service") and/or may indicate a media-service account corresponding to the media application (e.g., "Jane's Service Account").

In any event, the media playback system may receive the authorization code from the smartphone, and the media playback system may then transmit an authorization request to the media service. The authorization request may include all or a portion of the authorization code.

Afterwards, the media playback system may receive an authorization token from the media service (which may be referred to herein as "Jane's authorization token"). The authorization token may facilitate obtaining media, such as the music currently playing on the smartphone, from the media service.

Then, the media playback system may transmit to the media service a request for media for playback by the media playback system. Such a request may include the authorization token and perhaps a media-item identifier, such as an identifier of the currently playing music. Upon receiving media from the media service, the media playback system may then playback the media.

At some point in time, Bob may visit Jane's home, and Bob may have a media application on his tablet. The media application on Bob's tablet may be the same or different from the media application on Jane's smartphone. For instance, Bob's media application may correspond to the same or a different media service than Jane's media application.

In any event, Bob may wish to control Jane's media playback system using the media application on Bob's tablet. For example, Bob may like to use the media application on Bob's tablet to cause the media service that corresponds to that media application (e.g., "Bob's Service") to provide media to Jane's media playback system for playback. However, in some examples, complications may arise because the media-service account corresponding to the media application on Bob's tablet (e.g., "Bob's Service Account") is a "guest" account with respect to Jane's media playback system (e.g. Bob's Service Account is not associated with the media playback system). Thus, examples described herein may help address guest-account scenarios.

In particular, the media playback system may perform a check to determine whether Bob's Service Account has one or more similarities with any of the media-service accounts already associated with Jane's media playback system. To do this, the media application on Bob's tablet may communicate with the media playback system in a similar manner as the media application on Jane's smartphone, as described above. However, after the media playback system receives an authorization token corresponding to the media application installed on Bob's tablet (which may be referred to herein as "Bob's authorization token"), the media playback system may perform one or more additional operations before transmitting a request for media.

For example, the media playback system may transmit a request for identification information to Bob's Service. The request may include all or a portion of Bob's authorization token. The media playback system may in turn receive identification information from Bob's Service. The identification information may generally include information related to Bob's Service Account, such as one or more login or user names, among other information.

The media playback system may then compare the received identification information from Bob's Service with any media-service accounts already associated with the media playback system. For instance, Jane may have previously provided the media playback system access to one or more media services that Jane is authorized to access by providing account information, such as login credentials. The media playback system may thus compare the identification information from Bob's Service with identification information corresponding to any of these one or more media services, such as Jane's Service. There are several scenarios that may arise from this comparison.

In a first scenario, the media playback system may determine that the received identification information identifies a media-service account already associated with the media playback system. For example, Bob and Jane share a media-service account (e.g., a "family" account) and therefore, Jane's Service and Bob's Service are the same media service. In such a scenario, the media playback system may utilize Bob's or Jane's authorization token to obtain media from the media service. Moreover, the media playback system may assign first-level control permissions to the media application on Bob's tablet.

In a second scenario, the media playback system may determine that the received identification information identifies a media-service account that is not already associated with the media playback system but identifies a media service that is already associated with the media playback system. For example, Bob's Service and Jane's Service may be the same media service, but Bob's account may be independent from Jane's account. In such a scenario, the media playback system may utilize Jane's authorization token to obtain media from Bob's Service. Further, the media playback system may assign second-level control permissions to the media application on Bob's tablet.

In a third scenario, the media playback system may determine that the received identification information identifies a media service that is not associated with the media playback system (e.g., a media service that the media playback system is not authorized to access). For example, Bob's Service may correspond to Media Service A, while the media playback system is associated with media-service accounts to Media Services B and C. In such a scenario, the media playback system may utilize Bob's authorization token to obtain media from Bob's Service. Additionally, the media playback system may assign second-level, or perhaps third-level, control permissions to the media application on Bob's tablet.

After Jane's media playback system determines which authorization token to use to obtain media, the media playback system may then utilize that authorization token when requesting media from Bob's Service. In some examples, the authorization token may be temporary. For instance, the authorization token may expire after a predetermined amount of time or after a predetermined number of media items have been played back by the media playback system. After the authorization token expires, the media playback system may no longer obtain media from Bob's Service with that authorization token. In this way, Bob's tablet and Jane's media playback system may share, perhaps temporarily, access to a media service corresponding to the media application installed on Bob's tablet.

It should be understood that the above example is provided for the purposes of example and explanation only and should not be construed as limiting. Other examples are possible and contemplated herein.

As indicated above, examples provided herein are directed to sharing access to a media service between a media application on a computing device and a media playback system. In one aspect, a media playback system is provided. The media playback system comprises a network interface, at least one processor, a non-transitory computer-readable medium, and program instructions stored thereon. The program instructions are executable by the at least one processor to cause the media playback system to: (a) receive from a computing device an authorization code, wherein the authorization code corresponds to a media application installed on the computing device that is authorized to access media from a media service, (b) transmit to the media service an authorization request comprising the authorization code, (c) receive from the media service an authorization token that facilitates obtaining media from the media service, and (d) transmit to the media service a request for media for playback by the media playback system, wherein the request for media comprises the authorization token.

In another aspect, a non-transitory computer-readable medium is provided having instructions stored thereon that are executable by a playback device of a media playback system to cause the playback device to: (a) receive from a computing device an authorization code, wherein the authorization code corresponds to a media application installed on the computing device that is authorized to access media from a media service, (b) transmit to the media service an authorization request comprising the authorization code, (c) receive from the media service an authorization token that facilitates obtaining media from the media service, and (d) transmit to the media service a request for media for playback by the media playback system, wherein the request for media comprises the authorization token.

In a further aspect, a method is provided. The method involves a media playback system: (a) receiving from a computing device an authorization code, wherein the authorization code corresponds to a media application installed on the computing device that is authorized to access media from a media service, (b) transmitting to the media service an authorization request comprising the authorization code, (c) receiving from the media service an authorization token that facilitates obtaining media from the media service, and (d) transmitting to the media service a request for media for playback by the media playback system, wherein the request for media comprises the authorization token.

In yet another aspect, a media playback system is provided. The media playback system comprises a network interface, at least one processor, a non-transitory computer-readable medium, and program instructions stored thereon. The program instructions are executable by the at least one processor to cause the media playback system to: (a) transmit to a media service a request for identification information corresponding to an authorization token, wherein the request comprises the authorization token that corresponds to a media application installed on a computing device that is authorized to access media from the media service, (b) receive identification information from the media service, (c) compare the received identification information with one or more media-service accounts associated with the media playback system, and (d) based on comparing the received identification information with the one or more media-service accounts associated with the media playback system, assign control permissions to the computing device, wherein the control permissions facilitate controlling the media playback system.

In an additional aspect, a non-transitory computer-readable medium is provided having instructions stored thereon that are executable by a playback device of a media playback system to cause the playback device to: (a) transmit to a media service a request for identification information corresponding to an authorization token, wherein the request comprises the authorization token that corresponds to a media application installed on a computing device that is authorized to access media from the media service, (b) receive identification information from the media service, (c) compare the received identification information with one or more media-service accounts associated with the media playback system, and (d) based on comparing the received identification information with the one or more media-service accounts associated with the media playback system, assign control permissions to the computing device, wherein the control permissions facilitate controlling the media playback system.

In one other aspect, a method is provided. The method involves a media playback system: (a) transmitting to a media service a request for identification information corresponding to an authorization token, wherein the request comprises the authorization token that corresponds to a media application installed on a computing device that is authorized to access media from the media service, (b) receiving identification information from the media service, (c) comparing the received identification information with one or more media-service accounts associated with the media playback system, and (d) based on comparing the received identification information with the one or more media-service accounts associated with the media playback system, assigning control permissions to the computing device, wherein the control permissions facilitate controlling the media playback system.

It will be understood by one of ordinary skill in the art that this disclosure includes numerous other embodiments.

II. Example Network Configuration

FIG. 1 shows an example network configuration 100 in which one or more embodiments disclosed herein may be practiced or implemented. As shown, the network configuration 100 may include a media playback system 110, a computing device 120, and a media service 130. The media playback system 110 and the computing device 120 may be communicatively coupled via a LAN 140. The LAN 140 may be communicatively coupled to a WAN 150. The media service 130 may be communicatively coupled to the media playback system 110 via the LAN 140 and WAN 150 and may be communicatively coupled to the computing device 120 via the WAN 150 or the LAN 140 and WAN 150. It should be understood that the network configuration 100 may include multiple of the aforementioned network elements and/or additional network elements not illustrated.

The LAN 140 may include one or more wired or wireless networks, which may operate according to one or more network protocols. In some instances, the LAN 140 may include one or more Wi-Fi, Bluetooth, and/or proprietary networks. The LAN 140 may be configured to facilitate transferring data between various devices of the media playback system 110 and/or between the media playback system 110 and the computing device 120. The LAN 140 may be communicatively coupled to the WAN 150 via a wired or wireless interface.

The WAN 150 may include one or more wired or wireless networks, which may operate according to one or more network protocols. In examples, the WAN 150 may include the Internet and/or one or more cellular networks, among other networks. The WAN 110 may facilitate transferring data between one or more of the various network elements shown in FIG. 1. Although the LAN 140 and WAN 150 are shown as singular networks, it should be understood that the either or both may include multiple, distinct networks that are themselves communicatively linked.

Generally speaking, the media playback system 110 may be any type of media playback system configured to receive and transmit data over a data network and playback media items. In practice, the media playback system 110 may include one or more playback devices, one or more control devices, one or more networking devices, one or more amplifier devices, and/or one or more subwoofer devices, among other devices. An example media playback system is discussed in further detail below with reference to media playback system 200.

The computing device 120 may be any computing device configured to transfer data over a communication network. Example computing devices include, but are not limited to, cellular phones, smartphones, PDAs, tablets, laptops, and the like. The computing device 120 may include one or more processors, memory, a graphical display, one or more input interfaces, and one or more network interfaces, among other components. In some cases, the computing device 120 may be portable and as such, may be referred to herein as a "mobile device."

In examples, the computing device 120 may be configured to download, install, and operate an application, such as a media application. As noted above, the computing device 120 may be configured to utilize multiple applications, each of which may have different sets of functions. For example, the computing device 120 may obtain, via the WAN 150 and/or the LAN 140, a dedicated controller application from a server (not pictured) affiliated with a manufacturer, developer, or the like of the media playback system 110. One function of the dedicated controller application may be to control playback of media by the media playback system 110.

The dedicated controller application may be configured to perform one or more registration or setup operations with the media playback system 110 to "join" or otherwise become associated with the media playback system 110. Thereafter, the dedicated controller application may then be configured to control the media playback system 110.

A dedicated controller application may be unique to a given type of media playback system. That is, each manufacturer of media playback systems may provide a particular dedicated controller application. Moreover, a given manufacturer may provide multiple versions of its dedicated controller application, which may be platform specific (e.g., iOS™ and Android™ versions, among other possibilities).

Additionally or alternatively, the computing device 120 may obtain a media application from a media service, such as the media service 130, via the WAN 150. One function of the media application may be to obtain media from the media service 130 for playback by the computing device 120.

The media application may be configured to register with the media service. For example, the media application may be configured to receive new or existing media-service account information (e.g., a login or user name and/or password) and then use such information to obtain access to the media service. Once registered, the media application may be operable to cause the computing device 120 to obtain and playback media from the media service 130.

Furthermore, the media application may be operable to cause media from the media service 130 to be transmitted to the media playback system 110 for playback. That is, another function of the media application may be to serve as a controller of the media playback system 110. For instance, the media application may operate in this manner while the computing device 120 is on the same network as the media playback system 110 (e.g., when the computing device 120 is within the coverage area of the LAN 140). In such an operating state, the media application may be referred to herein as a "controller" or "controller application."

A media application may be unique to a given media service. That is, a given media service may provide its own media application. Moreover, a given media service may provide multiple versions of its media application, which may be platform specific (e.g., iOS™ and Android™ versions, among other possibilities).

In general, the media service 130 may be configured to provide media to computing devices and/or media playback systems via one or more data networks. In particular, the media service 130 may provide streaming media and/or media downloads, among other examples. For example, the media service 130 may provide "Internet radio" and/or "on-demand" services (e.g., where a user may request a particular media item), among other service types.

The media service 130 may include one or more media servers and/or other computing systems that may operate together or independently to perform one or more operations. A media server may include a network interface, a processing unit, and data storage, all of which may be communicatively linked together by a system bus, network, or other connection mechanism. The network interface may facilitate data flow between the media server and other network elements on the WAN 150. The processing unit may include one or more general purpose processors and/or one or more special purpose processors and may be integrated in whole or in part with the network interface. The data storage may include a non-transitory computer-readable medium, such as optical, magnetic, or flash memory, and may be integrated in whole or in part with the processing unit. The data storage may then include program instructions that are executable by the processing unit to carry out various functions described herein.

A media server may be configured to store media items (e.g., a media library) and/or access such media items to transmit to a media playback system and/or computing device. A media server may also be configured to create or obtain metadata related to the media items, as well as store such metadata. Further, a media server may be configured to store and/or access media application software and provide such software to computing devices, such as the computing device 120.

In examples, a media server may be configured to store and/or access one or more APIs. APIs may include one or more routines, protocols, and/or tools that facilitate providing media to media playback systems and/or computing devices. Moreover, a media server may be configured to receive API calls from, for example, the media playback system 110 and/or the computing device 120 and respond accordingly. For instance, a media server may be configured to receive a first type of API call from the media playback system 110 (e.g., a dedicated controller application). Additionally or alternatively, a media server may be configured to receive a second, different type of API call from the computing device 120 running a media application.

Further, a media server may be configured to authorize media playback systems and/or computing devices to access the media service's media library. To this end, a media server may be configured to store account information corresponding to media-service accounts that are registered with the media service 130. In examples, for each media-service account, the media server may store identification information, billing information, registered device/system identifiers, and/or media application information, among other information. Identification information may include one or more login or user names unique to each user on the given account, corresponding passwords, corresponding user profiles, an account type (e.g., "premium", "trial", "free", etc.), an account status (e.g., "active", "restricted", "inactive", "locked"), and/or an account name (e.g., "Jane's Account", "Bob's Account", "Jane's and Bob's Shared Account), among other information. In examples, a media server may be configured to utilize any of the above information to generate authorization codes and/or authorization tokens. These as well as other operations are discussed in further detail below.

III. Example Media Playback System

Figure 2:
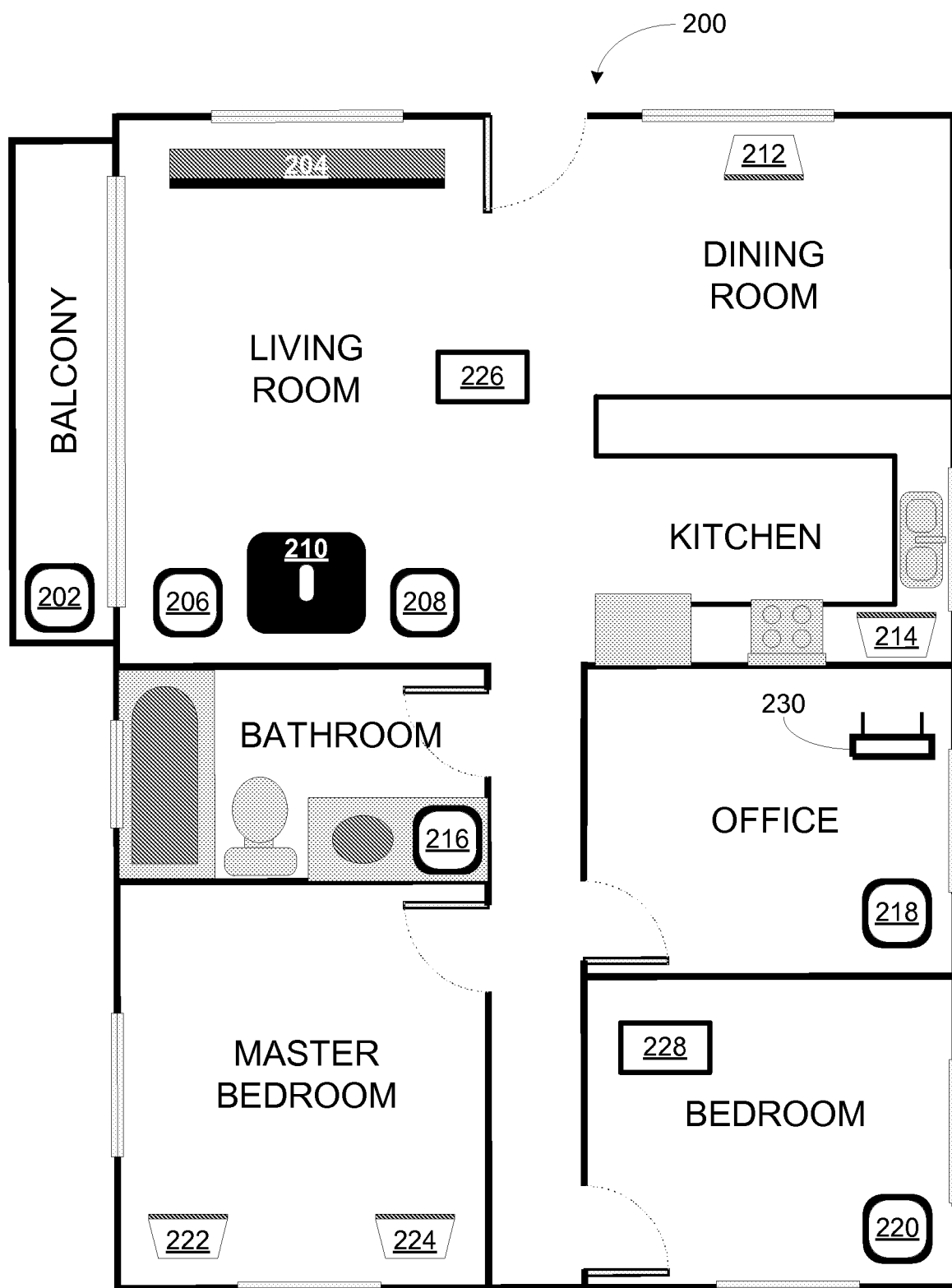
FIG. 2 shows an example media playback system configuration.

FIG. 2 shows an example configuration of a media playback system 200. The media playback system 200 as shown is associated with an example home environment having several rooms and spaces, such as for example, a master bedroom, an office, a dining room, and a living room. As shown in the example of FIG. 2, the media playback system 200 includes playback devices 202-224, control devices 226 and 228, and a wired or wireless network router 230.

Further discussions relating to the different components of the example media playback system 200 and how the different components may interact to provide a user with a media experience may be found in the following sections. While discussions herein may generally refer to the example media playback system 200, technologies described herein are not limited to applications within, among other things, the home environment as shown in FIG. 2. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 3:
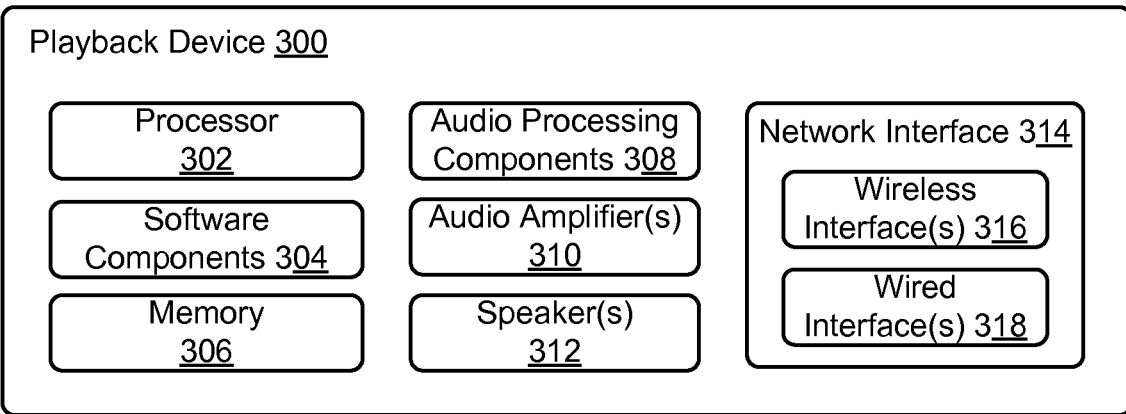
FIG. 3 shows a functional block diagram of an example playback device.

FIG. 3 shows a functional block diagram of an example playback device 300 that may be configured to be one or more of the playback devices 202-224 of the media playback system 200 of FIG. 2. The playback device 300 may include a processor 302, software components 304, memory 306, audio processing components 308, audio amplifier(s) 310, speaker(s) 312, and a network interface 314 including wireless interface(s) 316 and wired interface(s) 318. In one case, the playback device 300 may not include the speaker(s) 312, but rather a speaker interface for connecting the playback device 300 to external speakers. In another case, the playback device 300 may include neither the speaker(s) 312 nor the audio amplifier(s) 310, but rather an audio interface for connecting the playback device 300 to an external audio amplifier or audio-visual receiver.

In one example, the processor 302 may be a clock-driven computing component configured to process input data according to instructions stored in the memory 306. The memory 306 may be a tangible computer-readable medium configured to store instructions executable by the processor 302. For instance, the memory 306 may be data storage that can be loaded with one or more of the software components 304 executable by the processor 302 to achieve certain functions. In one example, the functions may involve the playback device 300 retrieving audio data from an audio source or another playback device. In another example, the functions may involve the playback device 300 sending audio data to another device or playback device on a network. In yet another example, the functions may involve pairing of the playback device 300 with one or more playback devices to create a multi-channel audio environment.

Certain functions may involve the playback device 300 synchronizing playback of audio content with one or more other playback devices. During synchronous playback, a listener will preferably not be able to perceive time-delay differences between playback of the audio content by the playback device 300 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 306 may further be configured to store data associated with the playback device 300, such as one or more zones and/or zone groups the playback device 300 is a part of, audio sources accessible by the playback device 300, or a playback queue that the playback device 300 (or some other playback device) may be associated with. The data may be stored as one or more state variables that are periodically updated and used to describe the state of the playback device 300. The memory 306 may also include the data associated with the state of the other devices of the media system, and shared from time to time among the devices so that one or more of the devices have the most recent data associated with the system. Other embodiments are also possible.

The audio processing components 308 may include one or more digital-to-analog converters (DAC), an audio preprocessing component, an audio enhancement component or a digital signal processor (DSP), and so on. In one embodiment, one or more of the audio processing components 308 may be a subcomponent of the processor 302. In one example, audio content may be processed and/or intentionally altered by the audio processing components 308 to produce audio signals. The produced audio signals may then be provided to the audio amplifier(s) 310 for amplification and playback through speaker(s) 312. Particularly, the audio amplifier(s) 310 may include devices configured to amplify audio signals to a level for driving one or more of the speakers 312. The speaker(s) 312 may include an individual transducer (e.g., a "driver") or a complete speaker system involving an enclosure with one or more drivers. A particular driver of the speaker(s) 312 may include, for example, a subwoofer (e.g., for low frequencies), a mid-range driver (e.g., for middle frequencies), and/or a tweeter (e.g., for high frequencies). In some cases, each transducer in the one or more speakers 312 may be driven by an individual corresponding audio amplifier of the audio amplifier(s) 310. In addition to producing analog signals for playback by the playback device 300, the audio processing components 308 may be configured to process audio content to be sent to one or more other playback devices for playback.

Audio content to be processed and/or played back by the playback device 300 may be received from an external source, such as via an audio line-in input connection (e.g., an auto-detecting 3.5 mm audio line-in connection) or the network interface 314.

The network interface 314 may be configured to facilitate a data flow between the playback device 300 and one or more other devices on a data network. As such, the playback device 300 may be configured to receive audio content over the data network from one or more other playback devices in communication with the playback device 300, network devices within a local area network, or audio content sources over a wide area network such as the Internet. In one example, the audio content and other signals transmitted and received by the playback device 300 may be transmitted in the form of digital packet data containing an Internet Protocol (IP)-based source address and IP-based destination addresses. In such a case, the network interface 314 may be configured to parse the digital packet data such that the data destined for the playback device 300 is properly received and processed by the playback device 300.

As shown, the network interface 314 may include wireless interface(s) 316 and wired interface(s) 318. The wireless interface(s) 316 may provide network interface functions for the playback device 300 to wirelessly communicate with other devices (e.g., other playback device(s), speaker(s), receiver(s), network device(s), control device(s), controller device(s) within a data network the playback device 300 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 318 may provide network interface functions for the playback device 300 to communicate over a wired connection with other devices in accordance with a communication protocol (e.g., IEEE 802.3). While the network interface 314 shown in FIG. 3 includes both wireless interface(s) 316 and wired interface(s) 318, the network interface 314 may in some embodiments include only wireless interface(s) or only wired interface(s).

In one example, the playback device 300 and one other playback device may be paired to play two separate audio components of audio content. For instance, playback device 300 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 300 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 300 is a playback device designed to render low frequency range audio content (i.e. a subwoofer), the playback device 300 may be consolidated with a playback device designed to render full frequency range audio content. In such a case, the full frequency range playback device, when consolidated with the low frequency playback device 300, may be configured to render only the mid and high frequency components of audio content, while the low frequency range playback device 300 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 3 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 200 of FIG. 2, the environment may have one or more playback zones, each with one or more playback devices. The media playback system 200 may be established with one or more playback zones, after which one or more zones may be added, or removed to arrive at the example configuration shown in FIG. 2. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 2, the balcony, dining room, kitchen, bathroom, office, and bedroom zones each have one playback device, while the living room and master bedroom zones each have multiple playback devices. In the living room zone, playback devices 204, 206, 208, and 210 may be configured to play audio content in synchrony as individual playback devices, as one or more bonded playback devices, as one or more consolidated playback devices, or any combination thereof. Similarly, in the case of the master bedroom, playback devices 222 and 224 may be configured to play audio content in synchrony as individual playback devices, as a bonded playback device, or as a consolidated playback device.

In one example, one or more playback zones in the environment of FIG. 2 may each be playing different audio content. For instance, the user may be grilling in the balcony zone and listening to hip hop music being played by the playback device 202 while another user may be preparing food in the kitchen zone and listening to classical music being played by the playback device 214. In another example, a playback zone may play the same audio content in synchrony with another playback zone. For instance, the user may be in the office zone where the playback device 218 is playing the same rock music that is being playing by playback device 202 in the balcony zone. In such a case, playback devices 202 and 218 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 200 may be dynamically modified, and in some embodiments, the media playback system 100 supports numerous configurations. For instance, if a user physically moves one or more playback devices to or from a zone, the media playback system 200 may be reconfigured to accommodate the change(s). For instance, if the user physically moves the playback device 202 from the balcony zone to the office zone, the office zone may now include both the playback device 218 and the playback device 202. The playback device 202 may be paired or grouped with the office zone and/or renamed if so desired via a control device such as the control devices 226 and 228. On the other hand, if the one or more playback devices are moved to a particular area in the home environment that is not already a playback zone, a new playback zone may be created for the particular area.

Further, different playback zones of the media playback system 200 may be dynamically combined into zone groups or split up into individual playback zones. For instance, the dining room zone and the kitchen zone 214 may be combined into a zone group for a dinner party such that playback devices 212 and 214 may render audio content in synchrony. On the other hand, the living room zone may be split into a television zone including playback device 204, and a listening zone including playback devices 206, 208, and 210, if the user wishes to listen to music in the living room space while another user wishes to watch television.

c. Example Control Devices

Figure 4:
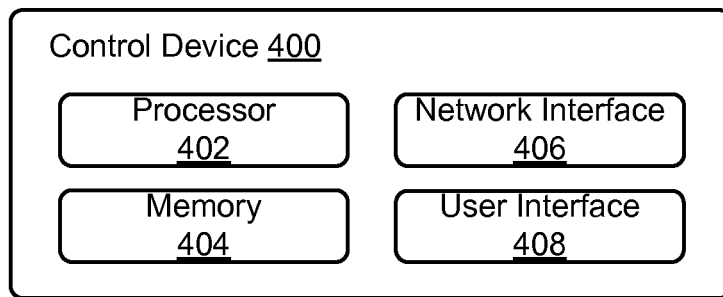
FIG. 4 shows a functional block diagram of an example control device.

FIG. 4 shows a functional block diagram of an example control device 400 that may be configured to be one or both of the control devices 226 and 228 of the media playback system 200. As shown, the control device 400 may include a processor 402, memory 404, a network interface 406, and a user interface 408. In one example, the control device 400 may be a dedicated controller for the media playback system 200.

In another example, the control device 400 may be a network device on which application software is installed, such as an iPhone™, iPad™ or any other smart phone, tablet or network device (e.g., a networked computer such as a PC or Mac™). In examples, the application may take the form of a dedicated controller application operable to control a media playback system. In yet another example, the media application may be operable to cause the control device 400 to obtain media (e.g., from a given media service provider associated with the media application) independent from a media playback system and may also be operable as a control device of a media playback system.

The processor 402 may be configured to perform functions relevant to facilitating user access, control, and configuration of the media playback system 200. The memory 404 may be configured to store instructions executable by the processor 402 to perform those functions. The memory 404 may also be configured to store the media playback system controller application software and other data associated with the media playback system 200 and the user.

In one example, the network interface 406 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 406 may provide a means for the control device 400 to communicate with other devices in the media playback system 200. In one example, data and information (e.g., such as a state variable) may be communicated between control device 400 and other devices via the network interface 406. For instance, playback zone and zone group configurations in the media playback system 200 may be received by the control device 400 from a playback device or another network device, or transmitted by the control device 400 to another playback device or network device via the network interface 406. In some cases, the other network device may be another control device.

Playback device control commands such as volume control and audio playback control may also be communicated from the control device 400 to a playback device via the network interface 406. As suggested above, changes to configurations of the media playback system 200 may also be performed by a user using the control device 400. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 400 may sometimes be referred to as a controller, whether the control device 400 is a dedicated controller or a network device on which media playback system controller application software is installed.

Figure 5:
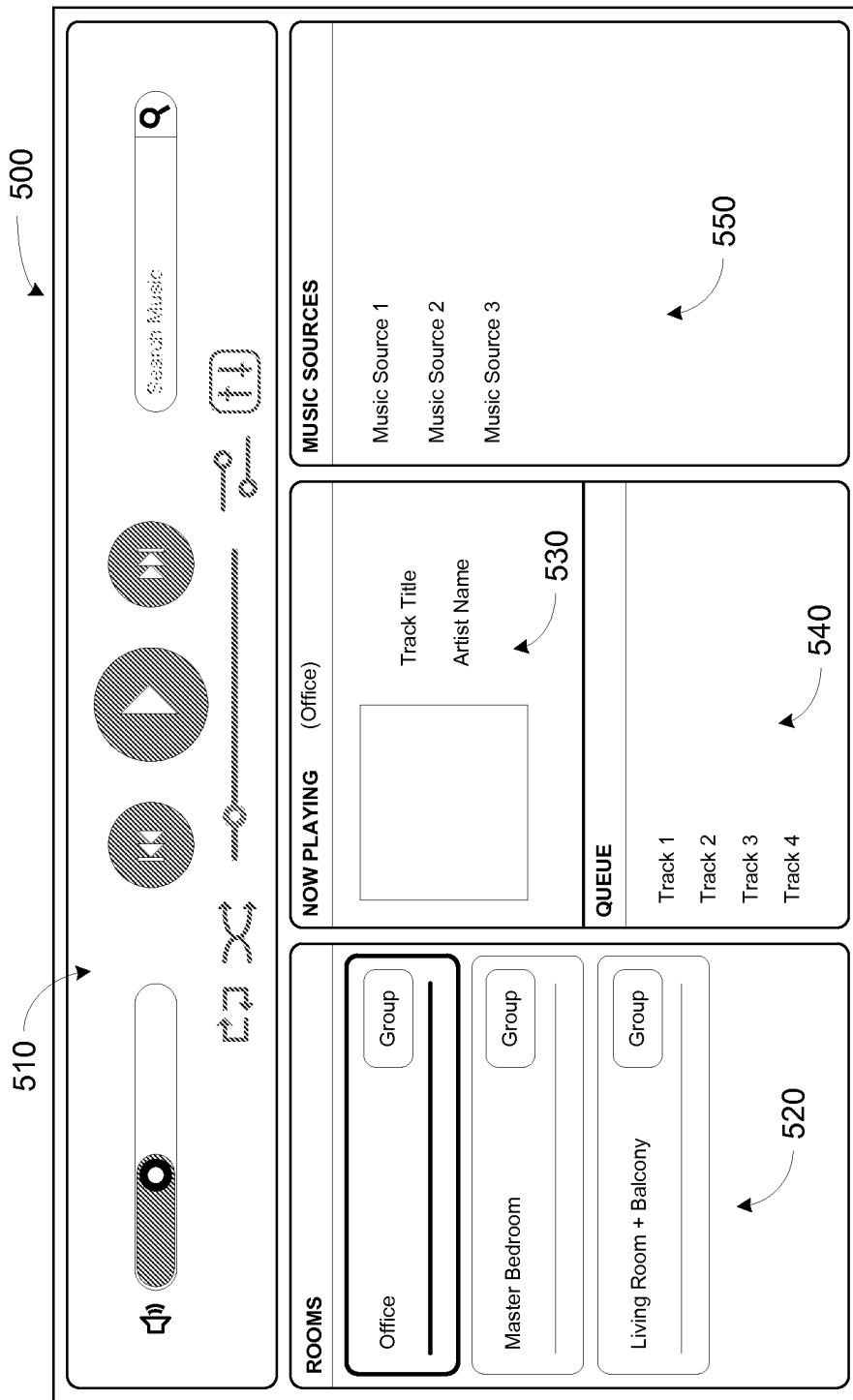
FIG. 5 shows an example controller interface.

The user interface 408 of the control device 400 may be configured to facilitate user access and control of the media playback system 200, by providing a controller interface such as the controller interface 500 shown in FIG. 5. The controller interface 500 includes a playback control region 510, a playback zone region 520, a playback status region 530, a playback queue region 540, and an audio content sources region 550. The user interface 500 as shown is just one example of a user interface that may be provided on a network device such as the control device 400 of FIG. 4 (and/or the control devices 226 and 228 of FIG. 2) and accessed by users to control a media playback system such as the media playback system 200. Other user interfaces of varying formats, styles, and interactive sequences may alternatively be implemented on one or more network devices to provide comparable control access to a media playback system.

The playback control region 510 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 510 may also include selectable icons to modify equalization settings, and playback volume, among other possibilities.

The playback zone region 520 may include representations of playback zones within the media playback system 200. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 500 are also possible. The representations of playback zones in the playback zone region 520 may be dynamically updated as playback zone or zone group configurations are modified.

The playback status region 530 may include graphical representations of audio content that is presently being played, previously played, or scheduled to play next in the selected playback zone or zone group. The selected playback zone or zone group may be visually distinguished on the user interface, such as within the playback zone region 520 and/or the playback status region 530. The graphical representations may include track title, artist name, album name, album year, track length, and other relevant information that may be useful for the user to know when controlling the media playback system via the user interface 500.

The playback queue region 540 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 500 of FIG. 5, the graphical representations of audio content in the playback queue region 540 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 550 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 200 of FIG. 2, local music libraries on one or more network devices (such as a control device, a network-enabled personal computer, or a networked-attached storage (NAS), for example), streaming audio services providing audio content via the Internet (e.g., the media service servers 135-145), or audio sources connected to the media playback system via a line-in input connection on a playback device or network devise, among other possibilities.

In some embodiments, audio content sources may be regularly added or removed from a media playback system such as the media playback system 200 of FIG. 2. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

IV. Access Sharing

As discussed above, examples provided herein are directed to a computing device and media playback system sharing access to a media service corresponding to a media application installed on the computing device. Operations may be discussed herein with respect to a particular system or device. This however is for purposes of example and explanation only and should not be construed as limiting. Other systems and/or devices may perform all or part of the operations without departing from the scope of the present examples.

Figure 6:
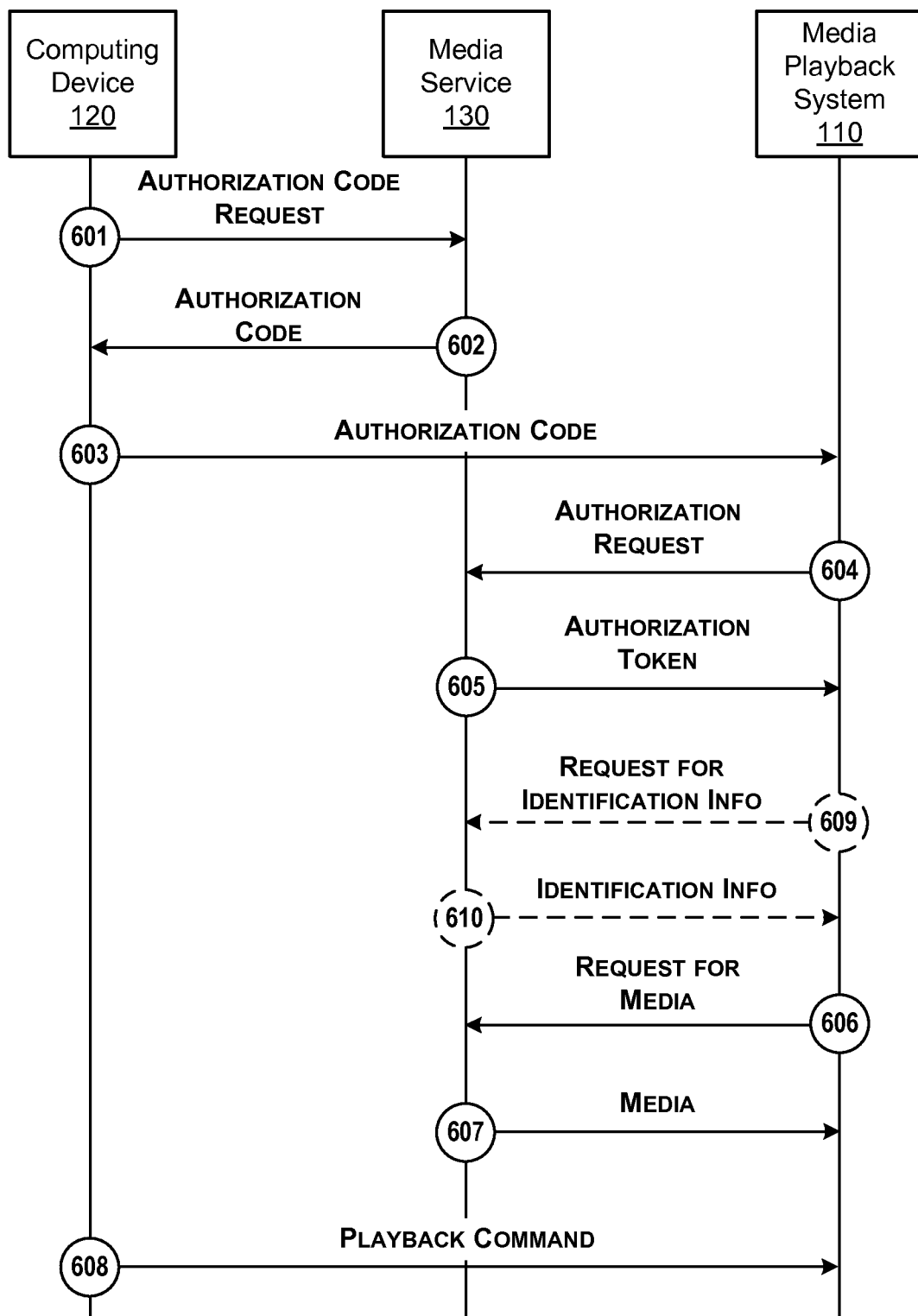
FIG. 6 shows an example signal-flow diagram depicting signal flow between various network elements.

FIG. 6 shows an example signal-flow diagram depicting signal flow between the media playback system 110, the computing device 120, and/or the media service 130 in accordance with example embodiments. In examples, some of the signal flows may represent API calls between network elements. Such signal flow may represent one or more device/system linking APIs that allow for integrating multiple, different types of API calls.

As suggested above, the depicted signal flow may result from a media application installed on the computing device 120 receiving a command to cause the media service 130 to provide media to the media playback system 110. For example, the below operations may result when Bob visits Jane and utilizes a media application on Bob's tablet to control Jane's media playback system or when Jane utilizes a media application, instead of a dedicated controller device or application, to control her media playback system.

As shown in FIG. 6, the computing device 120 may be configured to transmit 601 an authorization code request to the media service 130. Generally, the authorization code request may include a request for an authorization code that grants another computing device or system, such as the media playback system 110, access to the media service 130. In examples, the authorization code request may include information corresponding to the media application installed on the computing device 120. Such information may include login names, user names, and/or a password, among other information. In one instance, the authorization code request may take the form of an API call, such as the second type of API call discussed above.

The computing device 120 may be configured to transmit 601 the authorization code request based on a number of triggers. In some cases, the computing device 120 may be configured to perform this operation after the computing device 120 enters the coverage area of the LAN 140 and the media application detects that the media playback system 110 is present on the LAN 140.

In other cases, the computing device 120 may be configured to perform this operation after receiving data indicating a command for the media application to cause media to be played through the media playback system 110. For example, after entering the coverage area of the LAN 140, the computing device 120 may display an option, such as a graphical icon or the like, that when selected causes media provided by the media service 130 to play through the media playback system 110. Based on the computing device 120 receiving data indicating the selection of this option, the computing device 120 may be configured to transmit 601 the authorization code request. Other example triggers are also possible.

In any event, the media service 130 may be configured to generate an authorization code based on the authorization code request. For example, the media service 130 may be configured to generate the authorization code based on a login or user name. In other examples, the media service 130 may be configured to generate an authorization code based on other account information that corresponds to the computing device 120. For instance, the media service 130 may be configured to generate an authorization code based on an account type or any other account information discussed above.

Moreover, the media service 130 may also be configured to map the generated authorization code to account information stored by the media service 130 corresponding to the media-service account associated with the media application installed on the computing device 120. In this way, the media service 130 may identify and otherwise access account information, such as identification information, based on a particular authorization code.

In examples, an authorization code may be a randomly generated code. Such a code may include alphabetic, numeric, or other types of characters. In some cases, the authorization code may include an expiration that indicates a predetermined duration of time after which the authorization code is no longer valid. The expiration may be indicated by metadata of the authorization code, among other mechanisms.

As shown in FIG. 6, the media service 130 may be configured to transmit 602 a generated authorization code and the computing device 120 may be configured to receive the authorization code. In turn, the computing device 120 may be configured to transmit 603 the authorization code to the media playback system 110. The computing device 120 may transmit 603 the authorization code during an API call, such as a createP2SSession( ) API call.

In examples, the computing device 120 may also be configured to transmit a media-service identifier along with the authorization code, perhaps in metadata of the authorization code. A media-service identifier may uniquely identify the media service that corresponds to the authorization code (e.g., the media service 130). That is, each media service may be mapped to a particular media-service identifier. In some cases, the media-service identifier may identify (e.g., via a URI, URL, or other network identifier) a network location of one or more servers of the media service 130.

The media playback system 110 may be configured to receive from the computing device 120 the authorization code that corresponds to the media application installed on the computing device 120 that is authorized to access media from the media service 130. In examples, the media playback system 110 may be configured to receive the authorization code from the computing device 120 via the LAN 140.

Thereafter, the media playback system 110 may be configured to transmit 604 an authorization request to the media service 130. The authorization request may include all or a portion of the authorization code. In some instances, the media playback system 110 may transmit 604 the authorization request during an API call, such as the first type of API call discussed above.

In examples, the media playback system 110 may be configured to determine the network location of the media service 130 based on a media-service identifier that may have been included in the authorization code or provided along with the authorization code. After determining the network location of the media service 130, the media playback system 110 may then transmit 604 the authorization request.

In some cases, the authorization request may also include a media playback system identifier stored by the media playback system 110 that is unique to the media playback system 110. The media playback system identifier may operate to identify the media playback system 110 from all other media playback systems. In examples, the media playback system identifier may take the form of a household identifier (HHID) that may include alphabetic, numeric, or other types of characters.

The media service 130 may be configured to receive the authorization request and then determine whether the authorization code from the request maps to a media-service account of the media service 130. If the media service 130 identifies a media-service account associated with the authorization code, then the media service 130 may be configured to delete the authorization code from the account information of that media-service account, generate an authorization token, and then map and store the generated authorization token with the media-service account. The media service 130 may be configured to then transmit 605 the generated authorization token to the media playback system 110. If the media service 130 determines that the authorization code does not map to a media-service account, then the media service 130 may be configured to return an error message or the like to the media playback system 110.

In general, the authorization token is operable to provide a computing device or system access to the media service 130. The authorization token may include alphabetic, numeric, or other types of characters. In some examples, the authorization token may be configured to be only operable by a particular media playback system (e.g., the media playback system 110). In such examples, the media service 130 may be configured to utilize a received media playback system identifier (e.g., an HHID) to generate an authorization token that is only operable by the media playback system identified by that system identifier.

Moreover, the authorization token may include one or more parameters. In some cases, the authorization token may include an expiration that defines when the authorization token is valid (e.g., operable to gain access to the media service 130). For example, the expiration may be a predetermined duration of time (or perhaps a particular clock time) after which the authorization token is no longer valid. In another example, the expiration may be a predetermined number of media items that may be played back and once that number of media items is played back, the authorization token is no longer valid. In this way, the authorization token may be temporary.

The authorization token may also include one or more scope parameters. For example, a scope parameter may be operable to limit the extent to which the computing device 120 may control playback of the media playback system 110. In some cases, such a parameter may disable certain playback control operations that a control device might otherwise have, as discussed above. For instance, certain user-preference playback control operations (e.g., "liking", "starring", and/or storing a media item to a favorites list) may be disabled.

In another example, a scope parameter may be operable to limit the media that the media playback system 110 may receive from the media service 130. For instance, such a parameter may restrict the available media to certain types of media (e.g., Internet radio but not on-demand media), certain genres (e.g., radio edited but not uncensored media), certain albums, certain artists, and/or certain playlists, among other possibilities.

It should be understood that these are but a few possible authorization token parameters and that other parameters are also available. In examples, these parameters may be indicated by metadata of the authorization token or by another mechanism.

As shown in FIG. 6, after the media service 130 transmits 605 the authorization token, the media playback system 110 may be configured to receive the authorization token that facilities obtaining media from the media service 130. The media playback system 110 may then transmit 606 a request for media to the media service 130.

The request for media may include the authorization token. In some cases, the request for media may also include a media-item identifier, which may identify a particular song, podcast, playlist, channel, radio station, etc. for playback by the media playback system 110.

The media service 130 may be configured to receive the request for media and determine whether the authorization token is valid. If it is not valid (e.g., perhaps the token expired or corresponds to a different media service), then the media service 130 may be configured to return an error message or the like. If it is valid, then the media service 130 may be configured to provide 607 media to the media playback system 110.

In turn, the media playback system 110 may be configured to receive media from the media service 130 and then playback the received media. Thereafter, the computing device 120 may be configured to transmit 608 playback commands (e.g., skip forward or backward, pause, play, stop, shuffle, repeat, etc.) to the media playback system 110, which may be configured to receive such commands and playback media accordingly.

In some cases, before the media playback system 110 plays back the received media, the media playback system 110 may determine a playback location from which to start playback. For example, in a scenario where the computing device 120 is currently playing back media when the media application receives a command to playback that media through the media playback system 110, the media playback system 110 may determine, perhaps by communicating with the computing device 120, the current playback location (e.g., time within a given song, media item number within a playlist, etc.) of the currently playing media. Based on that determination, the media playback system 110 may start playback at the current playback location of the media and the computing device 120 may stop playback. In this way, the computing device 120 may pass playback of the media item to the media playback system 110.

In the event the authorization token includes a scope parameter, the media playback system 110 may playback the received media according to the scope parameter. For example, the media playback system 110 may playback media prior to expiration of the authorization token. In some cases, based on the authorization token expiring, the media playback system 110 may be configured to transmit to the computing device 120 a request for a new authorization code, which may then trigger the above operations for obtaining a new authorization token. In other examples, the scope parameter may disable certain playback controls available to the computing device 120, and thus, the media playback system 110 may disable or "grey out" certain controls that are displayed by the media application on the computing device 120. In another example, the scope parameter may restrict the available media, and in turn, the media playback system 110 may hide or "grey out" any restricted media, or the media playback system 110 may return an error message when the computing device 120 provides an instruction to playback such media. Other examples are also possible.

As shown in FIG. 6, in some cases, before the media playback system 110 transmits 606 a request for media, the media playback system 110 may transmit 609 to the media service 130 a request for identification information corresponding to the authorization token. The request for identification information may include all or a portion of the authorization token that corresponds to the media application installed on the computing device 120 that is authorized to access media from the media service 130. In examples, the media playback system 110 may transmit 609 the request for identification information during an API call, such as a getUserInfo ( ) API call.

Identification information may help address owner (e.g., Jane) versus guest (e.g., Bob) account scenarios when media applications are utilized to control a media playback system. For example, it may be desirable for the media playback system 110 to match the media-service account corresponding to the media application installed on the computing device 120 to any media-service accounts that are already associated with the media playback system 110. In this way, the media playback system 110 may enable personalization features and/or may provide control permissions to the media application, among other operations.

The media service 130 may be configured to identify identification information that maps to the received authorization token. For instance, the media service 130 may be configured to map the received authorization token to a particular media-service account and then extract some or all of the corresponding identification information. Moreover, the media service 130 may be configured to transmit 610 the extracted identification information to the media playback system 110.

The media playback system 110 may in turn be configured to receive identification information from the media service 130. The media playback system 110 may also be configured to compare the received identification information with any media-service accounts associated with the media playback system 110. That is, the media playback system 110 may be configured to determine whether the identification information matches, perhaps only partially, with any media-service accounts already associated with the media playback system 110. This operation may be performed in a number of ways.

In one example, the media playback system 110 may be configured to maintain a database of respective authorization tokens that correspond to one or more media-service accounts associated with the media playback system 110. That is, the media playback system 110 may maintain a database of authorization tokens from media services that that media playback system 110 can access and obtain media from. Then, to perform the comparison, the media playback system 110 may be configured to transmit to each associated media service a request for identification information corresponding to the respective authorization token. After receiving such information, the media playback system 110 may then be configured to perform the comparison and determine whether any matches exist (e.g., between user or login names, account names, etc.).

Based on comparing the received identification information (e.g., the identification information corresponding to the media application installed on the computing device 120) with the media-service accounts associated with the media playback system 110, the media playback system 110 may be configured to perform one or more operations. For instance, the media playback system 110 may determine, based on the identification information, whether to utilize the authorization token corresponding to the computing device 120 or an authorization token previously stored by the media playback system 110 to obtain media from the media service 130.

In a first scenario, such as the first scenario discussed previously in which Jane and Bob share a media-service account, the media playback system 110 may determine that the received identification information identifies a media-service account already associated with the media playback system 110. For example, the media application installed on the computing device 120 utilizes the same media-service account as the media playback system 110 or the media application and media playback system 110 are devices on a shared account (e.g., a "family" account). In such a scenario, the media playback system 110 may be configured to utilize an authorization token corresponding to the shared media-service account to obtain media from the media service 130 (e.g., either the authorization token corresponding to the media application installed on the computing device 120 or the authorization token previously stored by the media playback system 110). That is, the media playback system 110 may utilize the media-service account shared by Jane and Bob to obtain media from the media service 130.

In a second scenario, such as the second scenario described above in which Jane and Bob each have separate media-service accounts to the same media service, the media playback system 110 may determine that the received identification information identifies a media-service account that is not already associated with the media playback system 110 but identifies a media service that is already associated with the media playback system 110. For example, the media application installed on the computing device 120 and the media playback system 110 each have respective accounts to the media service 130 (e.g., one of the one or more media-service accounts associated with the media playback system 110 provides the media playback system 110 access to the media service 130). In such a scenario, the media playback system 110 may be configured to utilize the authorization token previously stored by the media playback system 110 to obtain media from the media service 130. That is, the media playback system 110 may utilize Jane's media-service account associated with the media playback system 110 but not Bob's media-service account associated with the computing device 120 to obtain media from the media service 130.

In a third scenario, such as the third media scenario discussed above in which Bob's media-service account is for a media service to which Jane does not have a media-service account, the media playback system 110 may determine that the received identification information identifies a media service that the media playback system 110 does not have access to. For example, the media playback system 110 may not have access to the media service 130 independent from the authorization code provided by the computing device 120 (e.g., none of one or more media-service accounts associated with the media playback system 110 provide access to the media service 130). In such a scenario, the media playback system 110 may be configured to utilize the authorization token corresponding to the computing device 120 to obtain media from the media service 130. That is, the media playback system 110 may utilize, perhaps temporarily, Bob's media-service account to obtain media from the media service 130.

In other instances, based on the media playback system 110 comparing the received identification information with the media-service accounts associated with the media playback system 110, the media playback system 110 may be configured to assign to the computing device 120 control permissions that facilitate controlling the media playback system 110. For example, in the first scenario described above, the media playback system 110 may be configured to assign first-level control permissions to the computing device 120.

In examples, first-level control permissions may be equivalent to control permissions of a dedicated controller device or dedicated controller application of the media playback system 110. It should be understood that such a controller device or controller application may be hypothetical (e.g., the media playback system 110 may not include a dedicated controller). In any event, first-level control permissions may provide the computing device 120 with unrestricted control over the media playback system 110.

In the second and third scenarios described above, the media playback system 110 may be configured to assign second-level control permissions to the computing device 120. Second level-control permissions may include a subset of the control permissions of a, perhaps hypothetical, dedicated controller device or dedicated controller application. For instance, the second-level control permissions may be less in number and/or scope than the first-level control permissions. As such, second-level control permissions may provide the computing device 120 with restricted control over the media playback system 110.

In some examples, the media playback system 110 may be configured to assign third-level controller permissions to the computing device 120 in the third scenario. Third level-control permissions may include a subset of the second level-control permissions. Other examples are also possible.

In any event, after the media playback system 110 determines which authorization token to utilize and/or assigns control permissions to the computing device 120, the media playback system 110 may request media from the media service 130. The media playback system 110 may continue to do so while the authorization token is valid.

In some examples, the media service 130 may periodically generate new authorization codes, perhaps based on a predetermined duration of time, and replace an existing authorization code and/or existing authorization token. Accordingly, the media playback system 110 may periodically receive authorization codes from the computing device 120. To regain access to the media service 130, the media playback system 110 may then periodically perform the operations discussed above to obtain a new authorization token.

Figure 7:
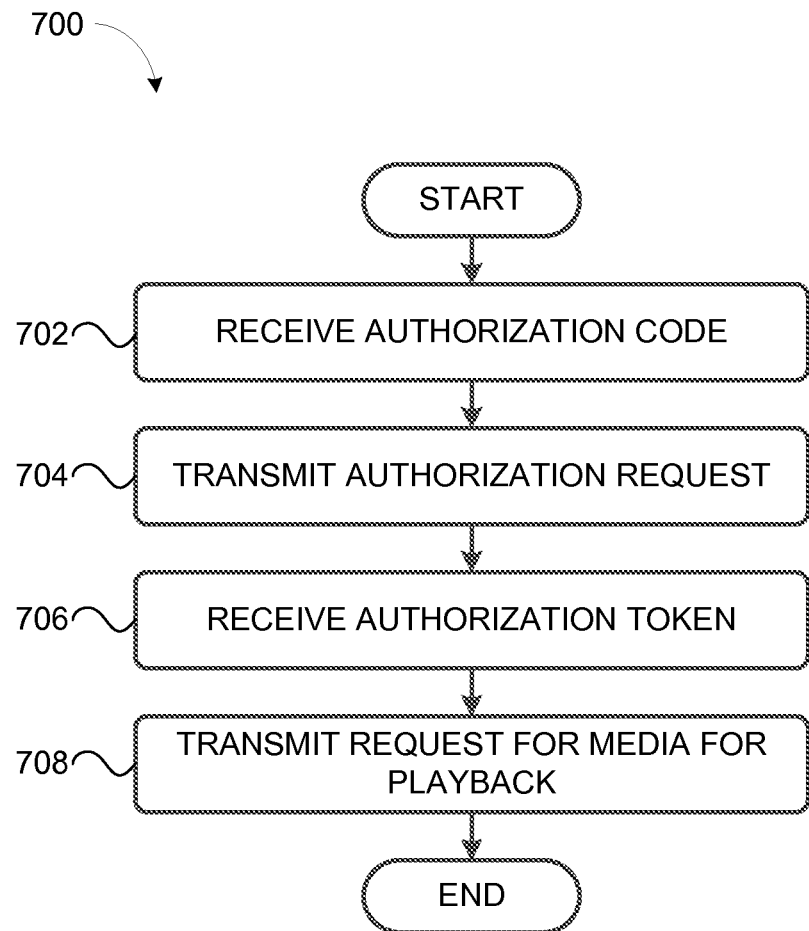
FIG. 7 shows a flow diagram of an example method.
Figure 8:
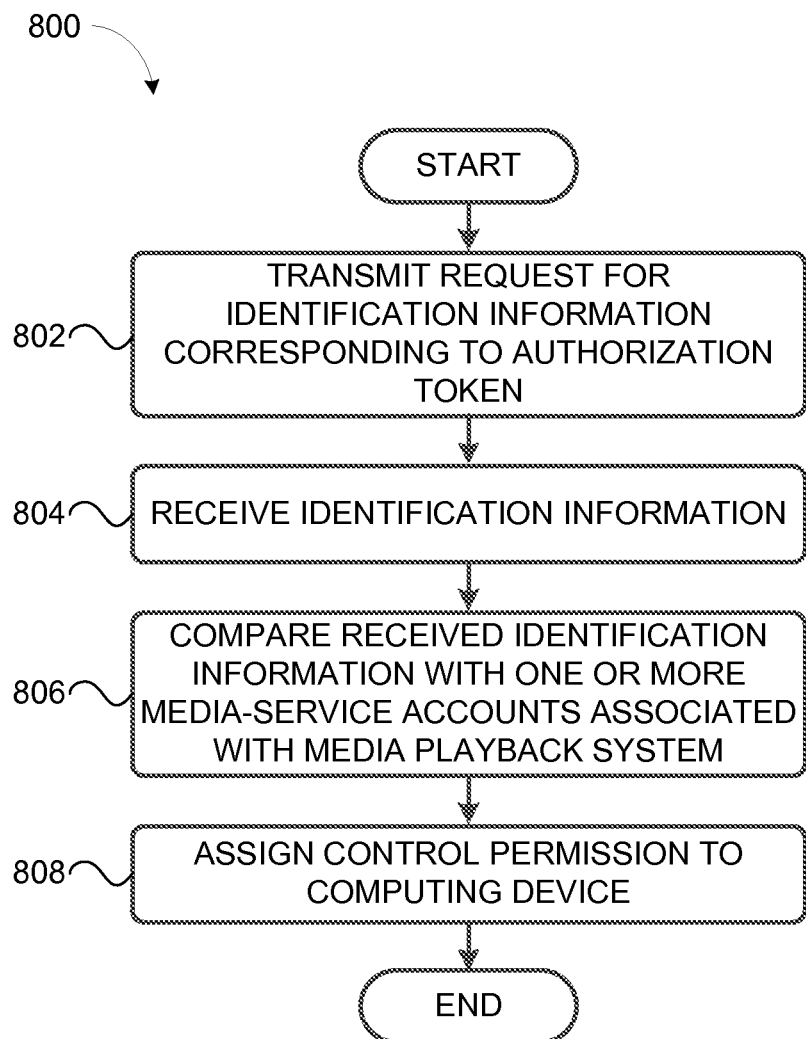
FIG. 8 shows a flow diagram of another example method.

Turning now to FIGS. 7 and 8, flow diagrams are shown to illustrate operations that may be carried out in accordance with example methods 700 and 800 respectively. For these methods and for other processes disclosed herein, the flow diagrams show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device. In addition, for the methods 700 and 800, and other processes and methods disclosed herein, each block in the respective figure may represent circuitry that is wired to perform the specific logical functions in the process.

Furthermore, although the blocks are illustrated in sequential order, these blocks may also be performed in parallel, and/or in a different order than those described herein. Also, the various blocks may be combined into fewer blocks, divided into additional blocks, and/or removed based upon the desired implementation.

For clarity, methods 700 and 800 are described herein with reference to FIG. 6. It should be understood, however, that this is for purposes of example and explanation only and that the operations of the methods are not limited to this figure.

Methods 700 and 800 shown in FIGS. 7 and 8, respectively, present embodiments that may be implemented within an operating environment (e.g., the network configuration 100 of FIG. 1) involving a media playback system, such as the media playback system 110 or 200, and in particular, a playback device of a media playback system, such as playback device 300. The methods may include one or more operations, functions, or actions as illustrated by one or more of the blocks shown in FIGS. 7 and 8. These operations, functions, or actions may be performed in line with the above discussion. Moreover, other of the operations, functions, or actions discussed above may be performed with or in addition to each of the methods 700 and 800.

Referring now to FIG. 7, at block 702, the method 700 involves the media playback system receiving from a computing device, such as the computing device 120, an authorization code (e.g., 603 of FIG. 6), where the authorization code corresponds to a media application installed on the computing device that is authorized to access media from a media service, such as the media service 130. At block 704, the method 700 involves the media playback system transmitting to the media service an authorization request (e.g., 604 of FIG. 6) comprising the authorization code. At block 706, the method 700 involves the media playback system receiving from the media service an authorization token (e.g., 605 of FIG. 6) that facilitates obtaining media from the media service. Then, at block 708, the method 700 involves transmitting to the media service a request for media (e.g., 606 of FIG. 6) for playback by the media playback system, where the request for media comprises the authorization token.

Turning to FIG. 8, at block 802, the method 800 involves the media playback system transmitting to a media service, such as the media service 130, a request for identification information corresponding to an authorization token (e.g., 609 of FIG. 6), where the request comprises the authorization token that corresponds to a media application installed on a computing device, such as the computing device 120, that is authorized to access media from the media service. At block 804, the method 800 involves the media playback system receiving identification information from the media service (e.g., 610 of FIG. 6). At block 806, the method 800 involves comparing the received identification information with one or more media-service accounts associated with the media playback system. Then, at block 808, the method 800 involves, based on comparing the received identification information with the one or more media-service accounts associated with the media playback system, assigning control permissions to the computing device, where the control permissions facilitate controlling the media playback system.

While some examples described herein may refer to operations performed by given actors, such as "users", "subscribers", and/or other entities, it should be understood that this is for purposes of explanation only. The claims should not be interpreted to require action by any such actors unless explicitly required by the language of the claims themselves.

VI. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, examples provided herein are directed to sharing access to a media service between a media application on a computing device and a media playback system. In one aspect, a media playback system is provided. The media playback system comprises a network interface, at least one processor, a non-transitory computer-readable medium, and program instructions stored thereon. The program instructions are executable by the at least one processor to cause the media playback system to: (a) receive from a computing device an authorization code, wherein the authorization code corresponds to a media application installed on the computing device that is authorized to access media from a media service, (b) transmit to the media service an authorization request comprising the authorization code, (c) receive from the media service an authorization token that facilitates obtaining media from the media service, and (d) transmit to the media service a request for media for playback by the media playback system, wherein the request for media comprises the authorization token.

In another aspect, a non-transitory computer-readable medium is provided having instructions stored thereon that are executable by a playback device of a media playback system to cause the playback device to: (a) receive from a computing device an authorization code, wherein the authorization code corresponds to a media application installed on the computing device that is authorized to access media from a media service, (b) transmit to the media service an authorization request comprising the authorization code, (c) receive from the media service an authorization token that facilitates obtaining media from the media service, and (d) transmit to the media service a request for media for playback by the media playback system, wherein the request for media comprises the authorization token.

In a further aspect, a method is provided. The method involves a media playback system: (a) receiving from a computing device an authorization code, wherein the authorization code corresponds to a media application installed on the computing device that is authorized to access media from a media service, (b) transmitting to the media service an authorization request comprising the authorization code, (c) receiving from the media service an authorization token that facilitates obtaining media from the media service, and (d) transmitting to the media service a request for media for playback by the media playback system, wherein the request for media comprises the authorization token.

In yet another aspect, a media playback system is provided. The media playback system comprises a network interface, at least one processor, a non-transitory computer-readable medium, and program instructions stored thereon. The program instructions are executable by the at least one processor to cause the media playback system to: (a) transmit to a media service a request for identification information corresponding to an authorization token, wherein the request comprises the authorization token that corresponds to a media application installed on a computing device that is authorized to access media from the media service, (b) receive identification information from the media service, (c) compare the received identification information with one or more media-service accounts associated with the media playback system, and (d) based on comparing the received identification information with the one or more media-service accounts associated with the media playback system, assign control permissions to the computing device, wherein the control permissions facilitate controlling the media playback system.

In an additional aspect, a non-transitory computer-readable medium is provided having instructions stored thereon that are executable by a playback device of a media playback system to cause the playback device to: (a) transmit to a media service a request for identification information corresponding to an authorization token, wherein the request comprises the authorization token that corresponds to a media application installed on a computing device that is authorized to access media from the media service, (b) receive identification information from the media service, (c) compare the received identification information with one or more media-service accounts associated with the media playback system, and (d) based on comparing the received identification information with the one or more media-service accounts associated with the media playback system, assign control permissions to the computing device, wherein the control permissions facilitate controlling the media playback system.

In one other aspect, a method is provided. The method involves a media playback system: (a) transmitting to a media service a request for identification information corresponding to an authorization token, wherein the request comprises the authorization token that corresponds to a media application installed on a computing device that is authorized to access media from the media service, (b) receiving identification information from the media service, (c) comparing the received identification information with one or more media-service accounts associated with the media playback system, and (d) based on comparing the received identification information with the one or more media-service accounts associated with the media playback system, assigning control permissions to the computing device, wherein the control permissions facilitate controlling the media playback system.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A playback device comprising:
    at least one communication interface;
    at least one processor;
    at least one non-transitory computer-readable medium comprising program instructions that are executable by the at least one processor such that the playback device is configured to:
        receive, via the at least one communication interface, at least one first message comprising an authorization code, wherein the authorization code has an expiration time after which the authorization code expires;
        transmit, via the at least one communication interface, at least one second message comprising the authorization code over a Wide Area Network (WAN);
        after transmitting of the at least one second message, receive at least one third message comprising an authorization token;
        receive, via the at least one communication interface, at least one fourth message comprising a command to play back media content;
        after receipt of the command to play back media content, transmit at least one fifth message collectively comprising (i) the authorization token and (ii) a request for the media content over the WAN; and
        after receipt of the media content, output the media content.

2. The playback device of claim 1, wherein the playback device is a television.

3. The playback device of claim 1, further comprising at least one audio amplifier and wherein the program instructions that are executable by the at least one processor such that the playback device is configured to output of the media content comprises program instructions that are executable by the at least one processor such that the playback device is configured to:
    play back the media content using the at least one audio amplifier.

4. The playback device of claim 1, wherein the program instructions that are executable by the at least one processor such that the playback device is configured to output the media content comprises program instructions that are executable by the at least one processor such that the playback device is configured to:
    output the media content in synchrony with at least one other playback device.

5. The playback device of claim 1, wherein the at least one fourth message comprises a plurality of messages and wherein the plurality of messages comprises:
    a sixth message comprising the authorization token; and
    a seventh message comprising the request for media content.

6. The playback device of claim 1, wherein the program instructions that are executable by the at least one processor such that the playback device is configured to receive the at least one first message comprising the authorization code comprise program instructions that are executable by the at least one processor such that the playback device is configured to:
    receive the at least one first message comprising the authorization code from a computing device over a Local Area Network (LAN).

7. The playback device of claim 1, wherein the program instructions that are executable by the at least one processor such that the playback device is configured to transmit the at least one second message comprising the authorization code comprise program instructions that are executable by the at least one processor such that the playback device is configured to:
    transmit the at least one second message comprising the authorization code before the expiration time.

8. The playback device of claim 1, further comprising program instructions stored on the non-transitory computer-readable medium that are executable by the at least one processor such that the playback device is configured to:
    after receipt of the media content, receive at least one sixth message comprising a playback command.

9. The playback device of claim 8, wherein the playback command comprises one of: a skip forward command, a backward skip command, a pause command, a play command, a stop command, a shuffle command, or a repeat command.

10. A non-transitory computer-readable medium, wherein the non-transitory computer-readable medium is provisioned with program instructions that, when executed by at least one processor, cause a playback device to:
    receive, via at least one communication interface of the playback device, at least one first message comprising an authorization code, wherein the authorization code has an expiration time after which the authorization code expires;

transmit, via the at least one communication interface, at least one second message comprising the authorization code over a Wide Area Network (WAN);

after transmitting of the at least one second message, receive at least one third message comprising an authorization token;

receive, via the at least one communication interface, at least one fourth message comprising a command to play back media content;

after receipt of the command to play back media content, transmit at least one fifth message collectively comprising (i) the authorization token and (ii) a request for the media content over the WAN; and after receipt of the media content, output the media content.

11. The non-transitory computer-readable medium of claim 10, wherein the playback device is a television.

12. The non-transitory computer-readable medium of claim 10, further comprising at least one audio amplifier and wherein the program instructions that, when executed by at least one processor, cause the playback device to output of the media content comprises program instructions that, when executed by at least one processor, cause the playback device to:

play back the media content using the at least one audio amplifier.

13. The non-transitory computer-readable medium of claim 10, wherein the program instructions that, when executed by at least one processor, cause the playback device to output the media content comprises program instructions that, when executed by at least one processor, cause the playback device to:

output the media content in synchrony with at least one other playback device.

14. The non-transitory computer-readable medium of claim 10, wherein the at least one fourth message comprises a plurality of messages and wherein the plurality of messages comprises:

a sixth message comprising the authorization token; and
a seventh message comprising the request for media content.

15. The non-transitory computer-readable medium of claim 10, wherein the program instructions that, when executed by at least one processor, cause the playback device to receive the at least one first message comprising the authorization code comprise program instructions that, when executed by at least one processor, cause the playback device to:

receive the at least one first message comprising the authorization code from a computing device over a Local Area Network (LAN).

16. The non-transitory computer-readable medium of claim 10, wherein the program instructions that, when executed by at least one processor, cause the playback device to transmit the at least one second message comprising the authorization code comprise program instructions that, when executed by at least one processor, cause the playback device to:

transmit the at least one second message comprising the authorization code before the expiration time.

17. The non-transitory computer-readable medium of claim 10, wherein the non-transitory computer-readable medium is also provisioned with program instructions that, when executed by at least one processor, cause the playback device to:

after receipt of the media content, receive at least one sixth message comprising a playback command.

18. The non-transitory computer-readable medium of claim 17, wherein the playback command comprises one of: a skip forward command, a backward skip command, a pause command, a play command, a stop command, a shuffle command, or a repeat command.

19. A method carried out by a playback device, the method comprising:

receiving, via at least one communication interface of the playback device, at least one first message comprising an authorization code, wherein the authorization code has an expiration time after which the authorization code expires;

transmitting, via the at least one communication interface, at least one second message comprising the authorization code over a Wide Area Network (WAN);

after transmitting of the at least one second message, receiving at least one third message comprising an authorization token;

receiving, via the at least one communication interface, at least one fourth message comprising a command to play back media content;

after receipt of the command to play back media content, transmitting at least one fifth message collectively comprising (i) the authorization token and (ii) a request for the media content over the WAN; and after receipt of the media content, outputting the media content.

20. The method of claim 19, wherein outputting the media content comprises outputting the media content in synchrony with at least one other playback device.

* * * * *